(12) United States Patent
Kim

(10) Patent No.: US 11,485,460 B2
(45) Date of Patent: Nov. 1, 2022

(54) BARGE FOR RECOVERY OF ROCKET LAUNCH VEHICLE

(71) Applicant: Chul Won Kim, Seoul (KR)

(72) Inventor: Chul Won Kim, Seoul (KR)

( * ) Notice: Subject to any disclaimer, the term of this patent is extended or adjusted under 35 U.S.C. 154(b) by 256 days.

(21) Appl. No.: 16/902,904

(22) Filed: Jun. 16, 2020

(65) Prior Publication Data

US 2020/0398949 A1    Dec. 24, 2020

(30) Foreign Application Priority Data

Jun. 19, 2019   (KR) .................... 10-2019-0072757

(51) Int. Cl.
*B63B 35/50* (2006.01)
*B64F 1/36* (2017.01)
*B63B 39/02* (2006.01)
*B63B 39/08* (2006.01)
*B63B 35/28* (2006.01)

(52) U.S. Cl.
CPC .............. *B63B 35/50* (2013.01); *B63B 35/28* (2013.01); *B63B 39/02* (2013.01); *B63B 39/08* (2013.01); *B64F 1/36* (2013.01)

(58) Field of Classification Search
CPC ......... B63B 39/02; B63B 39/08; B63B 39/28; B63B 35/28; B63B 35/50; B64F 1/36
USPC ..................... 114/258, 264, 266; 244/114 R
See application file for complete search history.

(56) References Cited

U.S. PATENT DOCUMENTS

| 2,807,429 | A | * | 9/1957 | Hawkins, Jr. ....... | B64C 29/0091 244/116 |
| 4,916,999 | A | * | 4/1990 | Palmer ...................... | F41F 3/04 89/1.8 |
| 8,678,321 | B2 | * | 3/2014 | Bezos .................... | B64G 1/002 244/158.9 |

* cited by examiner

*Primary Examiner* — Daniel V Venne
(74) *Attorney, Agent, or Firm* — Novick, Kim & Lee PLLC; Jae Youn Kim

(57) ABSTRACT

A barge for recovery of a rocket launch vehicle is proposed, which can recover a launch vehicle from the sea onto the land in safety during launch vehicle recovering work. The barge can recover the launch vehicle in safety by effectively preventing a slope of the structure which supports the launch vehicle.

7 Claims, 6 Drawing Sheets

BARGE FOR RECOVERY OF ROCKET LAUNCH VEHICLE

CROSS REFERENCE TO RELATED APPLICATION

The present application claims priority to Korean Patent Application No. 10-2019-0072757, filed Jun. 19, 2019, the entire disclosure of which is incorporated herein for all purposes by this reference.

BACKGROUND OF THE INVENTION

Field of the Invention

The present invention relates to a barge for recovery of a rocket launch vehicle, and more particularly, to a barge for recovery of a rocket launch vehicle which can recover a launch vehicle from the sea onto the land in safety during launch vehicle recovering work.

Background Art

A launch vehicle is the general term for devices for supplying propulsion to a satellite or a space probe and sending the satellite or the space probe into space. Such a launch vehicle requires astronomical sums of money in manufacturing the launch vehicle since having a high-power engine, a fuel tank and lots of auxiliary devices in order to break through the atmosphere of the earth. A conventional launch vehicle is divided and is thrown away after being used.

Recently, because satellites or launch vehicles have been frequently launched and various projects for a space travel are going on, various methods to reduce expenses related with launch vehicles have been tried. As a result, technology for recovering and reusing the launch vehicle used for launch has been developed and used. Space X which is a private enterprise has disclosed technology to recover and reuse a launch vehicle through a precise posture control and reverse propulsion after making the launch vehicle, which went through the atmosphere of the earth, reenter into the atmosphere.

Launch of a spaceship is achieved on land, but the launch vehicle recovery work is often achieved on the sea rather than on the land because of the problem of costs. However, it is inefficient since the launch vehicle must store lots of fuel in order to return to a recovery spot in the case of returning the launch vehicle, which was launched on the land, onto the land which is a launch point and to recover the launch vehicle. Therefore, the launch vehicle is often recovered from the sea, which is not far from the launch vehicle separated point, and moved onto the land, after being launched toward the sea or launched to go via sea.

When the launch vehicle is recovered from the sea, a vessel like a barge provides a place on which the launch vehicle lands. As described above, if the launch vehicle lands on the barge floating on the sea, there is a problem in that the launch vehicle cannot accurately land on the barge since it is difficult to maintain level due to pitching and rolling of the barge. In general, a single-stage launch vehicle lands vertically while reducing its speed through reverse propulsion. The launch vehicle is weak to a slope since the length in contrast to the cross section is larger. Therefore, the launch vehicle must be launched in consideration of places and weather that the sea level is calm. If weather on the field is not good at a recovery moment, it is highly possible to fail recovery of the launch vehicle. Additionally, while the launch vehicle recovered on the barge is transported onto the land, it is also highly possible that the launch vehicle falls down due to a slope of the barge.

In order to solve the above problems, people need a device having a structure to recover the launch vehicle stably and move the launch vehicle to a target port in safety.

SUMMARY OF THE INVENTION

Accordingly, the present invention has been made to solve the above-mentioned problems occurring in the prior arts, and it is an object of the present invention to provide a barge for recovery of a rocket launch vehicle, which can always horizontally support a recovered launch vehicle in stability without any influence of waves when the launch vehicle is recovered from the sea.

To accomplish the above object, according to the present invention, there is provided a barge for recovery of a rocket launch vehicle including: a floating plate formed in a barge type to float on the sea; a plate type landing platform arranged above the floating plate so that a launch vehicle can land on the landing platform; a support member mounted between the floating plate and the landing platform in order to support the landing platform relative to the floating plate while allowing a slope of the landing platform relative to the floating plate; a plurality of operation members of which both ends are respectively connected to the floating plate and the landing plate in order to adjust an angle between the floating plate and the landing platform, the operation members varying their lengths according to an operation signal; slope sensors mounted on at least one of the floating plate and the landing platform in order to sense a slope of one of the floating plate and the landing platform; and a control unit which receives a measured value of the slope sensors and generates the operation signal to operate the plurality of operation members in order to maintain level of the landing platform.

The barge for recovery of a rocket launch vehicle according to the present invention can recover the launch vehicle in safety by always maintaining level of the launch vehicle.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, a barge for recovery of a rocket launch vehicle according to a preferred embodiment of the present invention will be described in detail with reference to the accompanying drawings.

Figure 1:
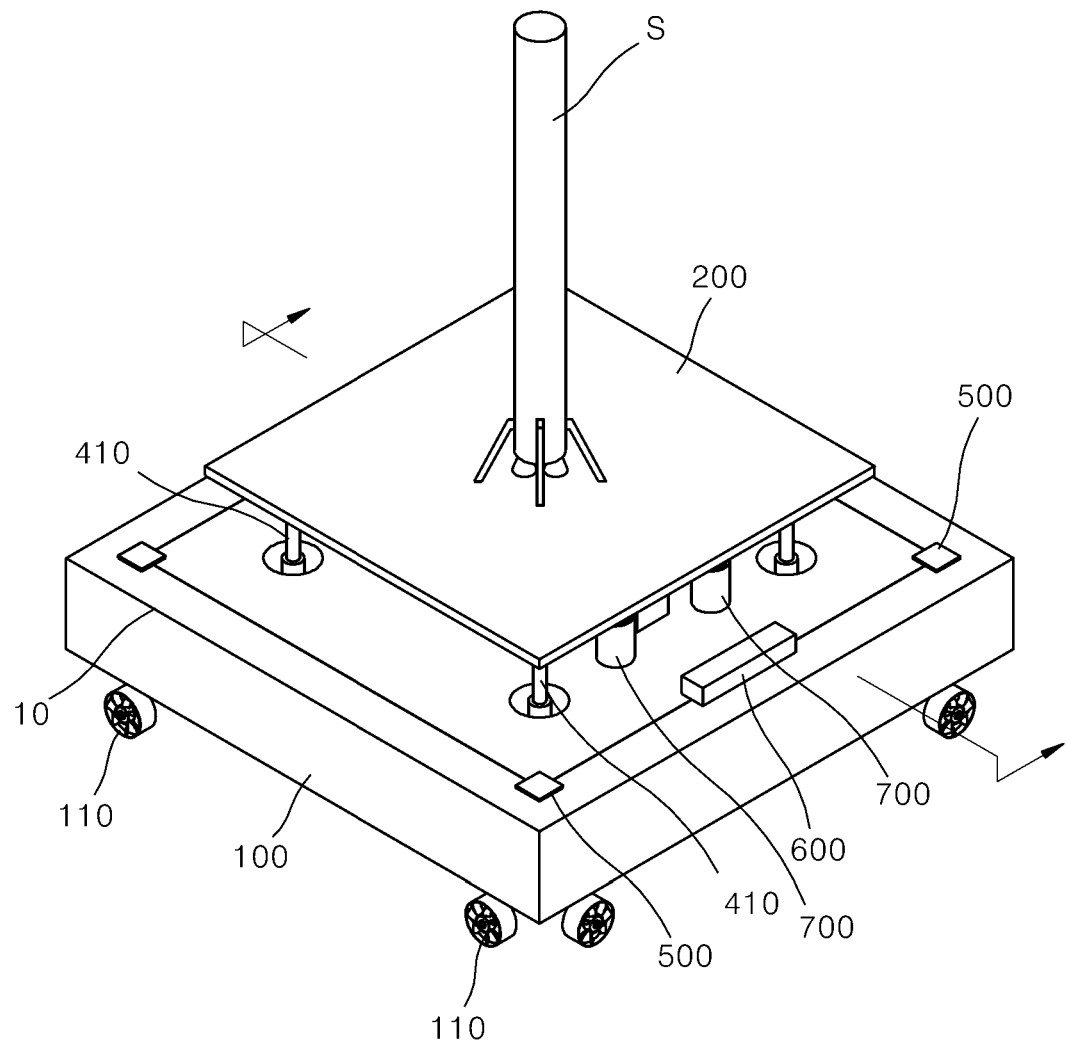
FIG. 1 is a perspective view of a barge for recovery of a rocket launch vehicle according to a preferred embodiment of the present invention.
Figure 2:
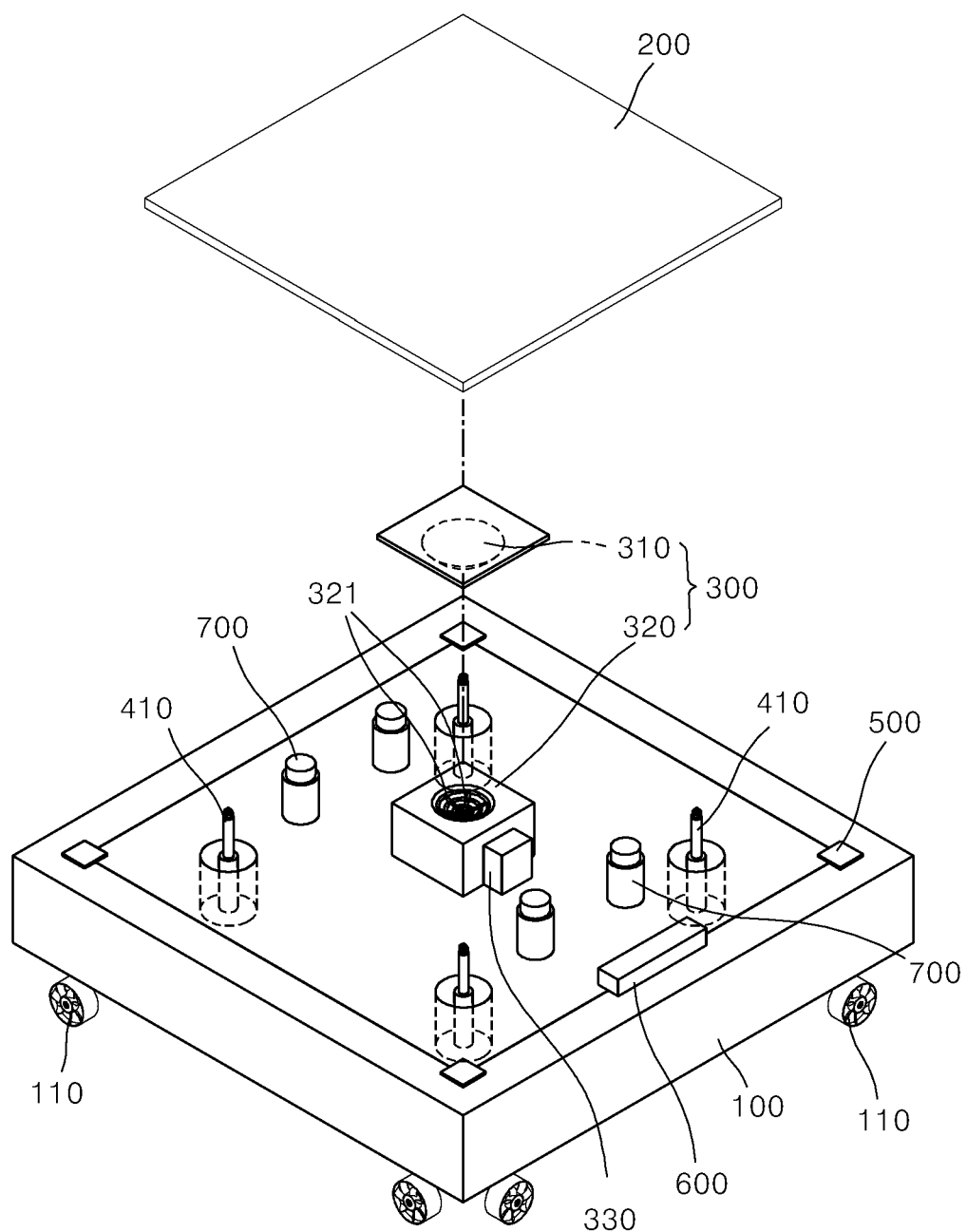
FIG. 2 is an exploded perspective view of the barge for recovery of the rocket launch vehicle illustrated in FIG. 1.
Figure 3:
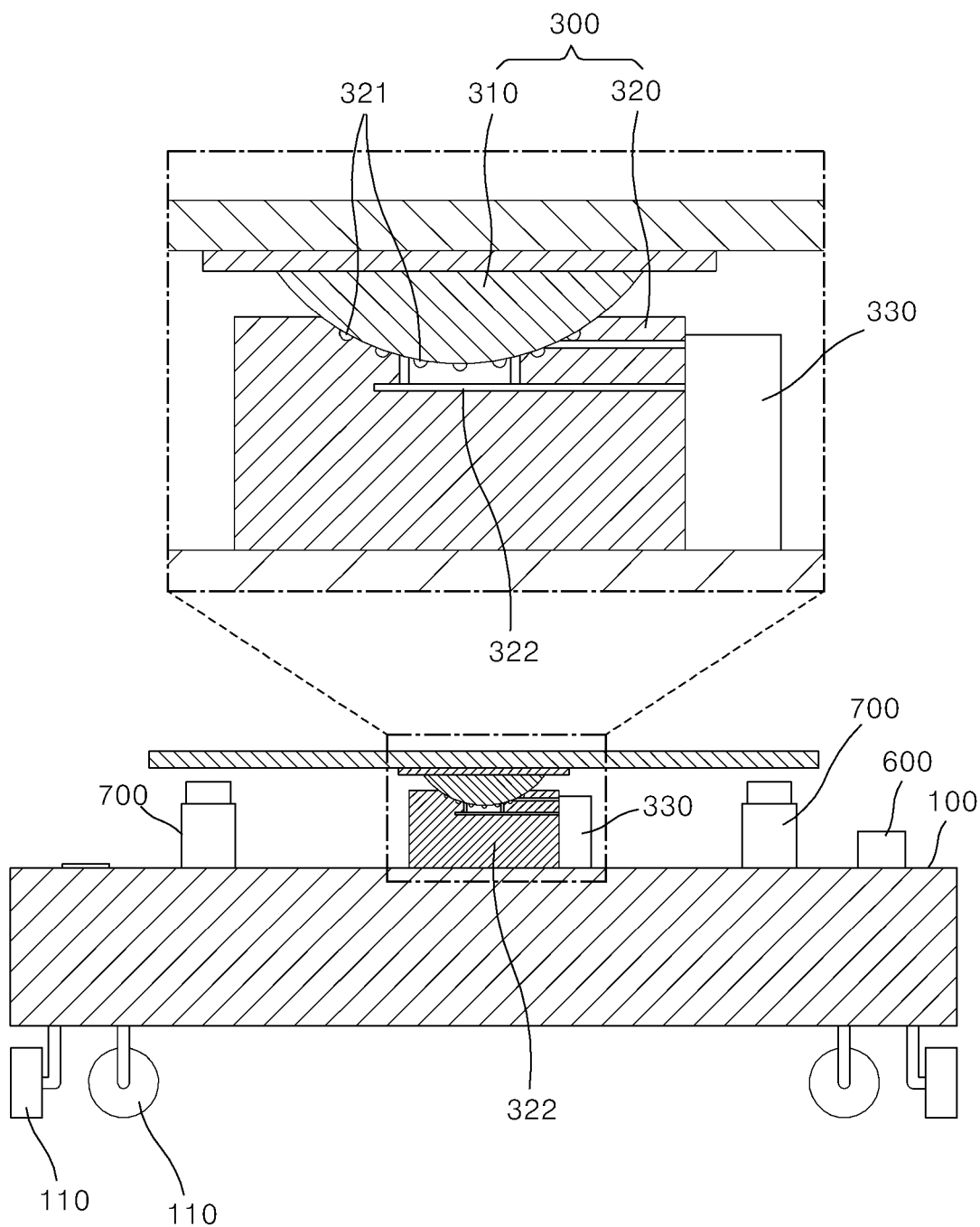
FIG. 3 is a sectional view taken along the line of III-III of the barge for recovery of the rocket launch vehicle illustrated in FIG. 1.

FIG. 1 is a perspective view of a barge for recovery of a rocket launch vehicle according to a preferred embodiment of the present invention, FIG. 2 is an exploded perspective view of the barge for recovery of the rocket launch vehicle illustrated in FIG. 1, and FIG. 3 is a sectional view taken along the line of III-III of the barge for recovery of the rocket launch vehicle illustrated in FIG. 1.

Referring to FIGS. 1 and 2, the barge for recovery of the rocket launch vehicle according to the preferred embodiment of the present invention includes a floating plate 100, a landing platform 200, a support member 300, a plurality of operation members 410, a plurality of slope sensors 500, and a control unit 600.

The floating plate 100 is formed in a barge type to float on the sea. Here, the barge means a vessel having a wide and flat hull. The floating plate 100 has a plate type upper part. It is preferable that the floating plate 100 be made of a steel material like metal in order to stably support components of the barge for recovery of the rocket launch vehicle according to the preferred embodiment of the present invention.

The floating plate 100 may include a plurality of side thrusters 110. In this embodiment, as shown in FIGS. 1 and 2, total eight side thrusters 110 are mounted. The side thrusters 110 causes propulsion relative to the surface of the sea and moves the floating plate 100 in order to adjust the location of the floating plate 100. The floating plate 100 is moved very far by a tug boat since being formed in a barge type. However, if it is necessary to adjust the location and the direction of the floating plate 100 while moving on the sea at a short distance, the side thrusters 110 are operated to adjust the location and the direction of the floating plate 100. The control unit 600 controls operation of the side thrusters 110.

The landing platform 200 has a plate type structure having a float upper part and is arranged above the floating plate 100.

The landing platform 200 is a part on which a launch vehicle (S) lands. Moreover, while the barge for recovery of the rocket launch vehicle is moved by the tug boat, the landing platform 200 supports the launch vehicle (S). It is preferable that the landing platform 200 be made of a hard metallic material in order to stably support the launch vehicle (S). In this embodiment, as shown in FIGS. 1 and 2, the landing platform 200 is a rectangular plate. According to circumstances, the landing platform 200 may be manufactured into a disc shape, or one of other various structures having a flat upper surface.

The support member 300 is arranged between the landing platform 200 and the floating plate 100. That is, the landing platform 200 is mounted above the floating plate 100 through the support member 300. The support member 300 includes a support ball 310 and a ball block 320.

The support ball 310 is joined to a lower central portion of the landing platform 200 in order to support weight (static weight and dynamic weight) of the landing platform 200. The support ball 310 is formed to protrude convexly in a hemispherical shape downwardly. The ball block 320 is fixed and joined to an upper part of the floating plate 100. The ball block 320 is formed concavely to correspond to the support ball 310. The support ball 310 is seated on the ball block 320 slidably. Because the support ball 310 is seated on the ball block 320 slidably, the support ball 310 is not separated and is mounted on the ball block 320 in state where a slope angle is variable. Due to the relationship between the support ball 310 and the ball block 320, the landing platform 200 is mounted to slide smoothly even though a relative slope for the floating plate 100 is changed.

That is, the support member supports the weight of the landing platform 200 while allowing the slope of the landing platform 200 relative to the floating plate 100.

A lubrication material is injected between the ball block 320 and the support ball 310 of the support member 300 in order to help smooth sliding of the support member 300. A lubrication groove 321 is formed in at least one of the ball block 320 and the support ball 310 of the support member 300. In this embodiment, as shown in FIGS. 2 and 3, the lubrication groove 321 is formed in the ball block 320. A plurality of lubricant supply passages 322 are formed inside the ball block 320, and a lubrication module 330 supplies lubricant through the lubricant supply passages 322. In this embodiment, lubricant is supplied through the lubricant supply passage 322 connected to the upper part of the ball block 320, and is recovered through the lubricant supply passage 322 connected to the lower part of the ball block 320, so that lubricant is generally circulated. The lubrication module 330 filters foreign matters, such as seawater or dust, contained in the lubricant, refines impurities, and adjusts temperature while circulating the lubricant.

A plurality of operation members 410 are mounted between the floating plate 100 and the landing platform 200. As shown in FIGS. 2 and 3, in this embodiment, four operation members 410 are mounted and both ends of each operation member 410 are connected to the floating plate 100 and the landing platform 200. The four operation members 310 are arranged at intervals of the same angle (at intervals of 90 degrees) around support member 300. The operation members 410 is operated to increase or decrease in length according to an operation signal generated from the control unit 600. The control unit 600 operates the four operation members 410 to increase or decrease in length so that the slope between the floating plate 100 and the landing platform 200 is adjusted. That is, the operation members 410 adjust the interval between the floating plate 100 and the landing platform 200 at their mounted points, so that the control unit 600 generally adjust the angle between the floating plate 100 and the landing platform 200. Preferably, the operation members 410 is connected through a mechanical element, such as a universal joint or a ball joint, at the point where they are connected with the floating plate 100 and the landing platform 200. Through the above structure, the operation members 410 can change the angle (slope) between the floating plate 100 and landing platform 200.

The slope sensors 500 are mounted on at least one of the floating plate 100 and the landing platform 200 so as to sense the slope between the floating plate 100 and the landing platform 200. In this embodiment, the slope sensors 500 are mounted on the floating plate 100. The slope sensors 500 may be gravity sensors, acceleration sensors, Gyro sensors or others which can sense the level that the floating plate 100 or the landing platform 200 is inclined relative to a horizontal direction. In this embodiment, a plurality of gravity sensors which can sense the level that the floating plate 100 is inclined relative to the direction of gravity are mounted on the floating plate 100. The slope sensors 500 sense the slope level of the floating plate 100 and transfer a measured value to the control unit 600.

The control unit 600 generates the operation signal to operate the operation members 410 using the measured value received from the slope sensors 500. That is, the control unit 600 senses the level that the floating plate 100 is inclined in the horizontal direction by exterior influences, like waves, through the slope sensors 500, and generates the operation signal to operate the operation members 410 to maintain level of the landing platform 200.

Referring to FIGS. 1 to 3, four jack-up members 700 are mounted on the floating plate 100. The jack-up members 700 serve to raise the landing platform 200 relative to the floating plate 100. The jack-up members 700 are hydraulic devices to raise the very heavy landing platform 200 relative to the floating plate 100. The support ball 310 is separated from the landing platform 200, and the ball block 320 is separated from the floating plate 100. After that, the support ball 310 and the ball block 320 are assembled with each other to restrict each other. In the above state, when the jack-up members 700 raise the floating plate 100 from the landing platform 200, the restriction between the support ball 310 and the ball block 320 can be released. The jack-up members 700 may be mounted on the floating plate 100 to be detachable. Because the jack-up members 700 are necessary for maintenance, if not necessary, the jack-up members 700 are separated from the floating plate 100, and are stored in a separate place, and then, is mounted on the floating plate 100 if necessary.

Hereinafter, an operation of the barge for recovery of the rocket launch vehicle according to the present invention will be described.

An aviation rocket launched into the space isolates the launch vehicle (S), which consumed propellant fuel during a propulsion process, in order to drop the launch vehicle (S). The barge for recovery of the rocket launch vehicle according to the embodiment of the present invention is transported by a tug boat to a point that it is expected for the isolated launch vehicle (S) to drop. In this above state, the launch vehicle (S) lands on the landing platform 200 by its posture control and location control.

Figure 4:
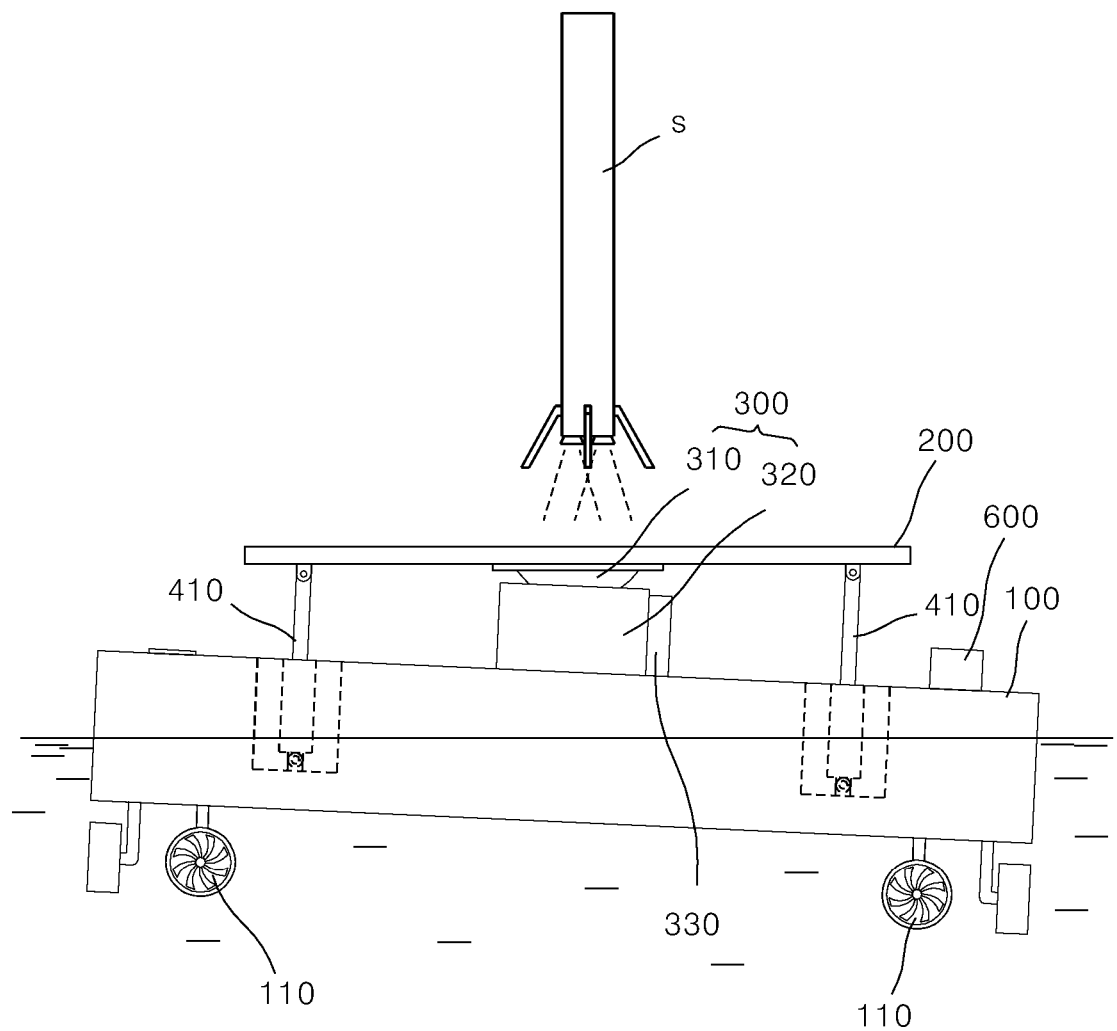
FIGS. 4 to 6 are side views for showing an operation of the barge for recovery of the rocket launch vehicle illustrated in FIG. 1.

In this instance, in order to make the launch vehicle (S) land on the landing platform 200 in safety, the landing platform 200 must maintain level. FIG. 4 illustrates a process that the launch vehicle (S) lands on the landing platform 200.

The floating plate 100 may be inclined by external causes, such as waves or sea current. In order to make the launch vehicle (S) land on the landing platform 200 in safety, the landing platform 200 maintains level.

Even though the barge for recovery of the rocket launch vehicle according to the embodiment of the present invention is inclined on the surface of the sea by some causes, such as waves, the landing platform 200 operates to maintain level by operations of the operation members 410 and the support member 300.

The floating plate 100 get inclined relative to a level surface by the causes such as waves. The floating plate 100 may move vertically by waves but is not turned over since the launch vehicle (S) is inclined by the vertical movement of the floating plate 100.

Figure 5:
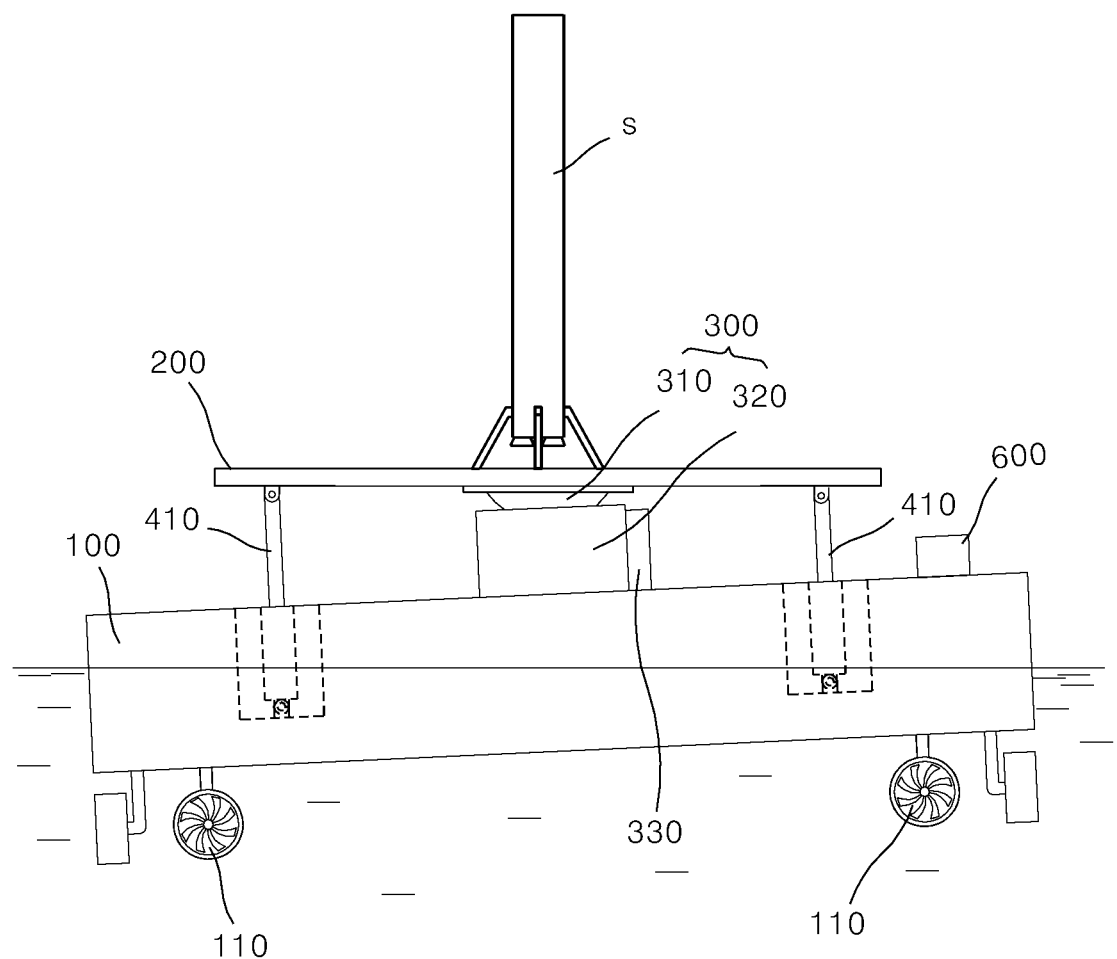
Figure 6:
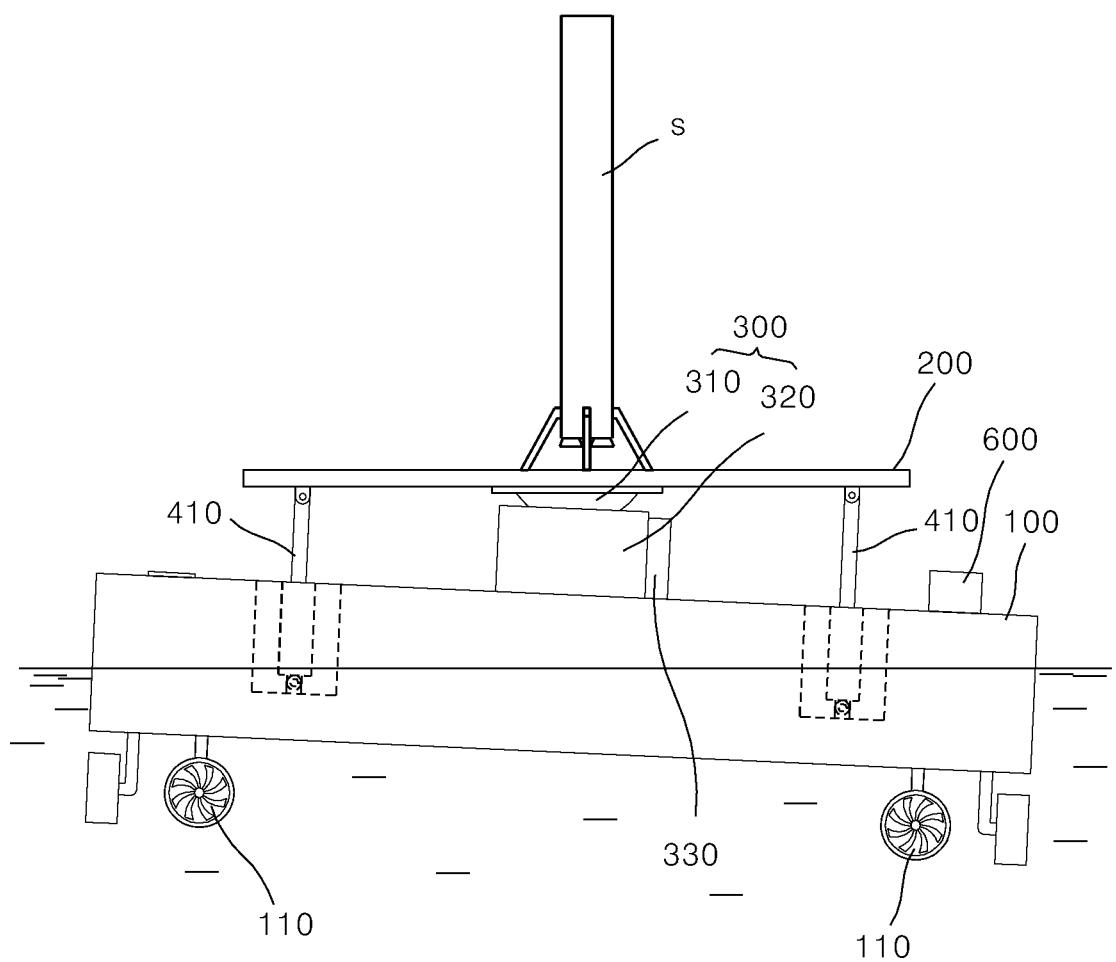

The slope sensors 500 sense the slope angle of the floating plate 100 in real time and transfer a measured value to the control unit 600. The control unit 600 receives the measured value of the slope sensors 500 in real time and generates the operation signal to operate the operation members 410 in order to maintain level of the landing platform 200. That is, the control unit 600 operates the operation members 410 in such a way that the operation member 410 located at a part where the floating plate 100 lowers is increased in length and the operation member 410 located at a part where the floating plate 100 rises up is decreased in length. As shown in FIGS. 4 to 6, even though the floating plate 100 is inclined, the landing platform 200 can maintain level by the operation signal of the control unit 600.

In the meantime, the support member 300 supports the landing platform 200 relative to the floating plate 100 and assists the floating plate 100 in sliding and smoothly inclining relative to the landing platform 200 without separation.

Because the hemispherical support ball 310 is supported to be inclined in the state where it is seated on the ball block 320, the floating plate 100 is inclined together with the surface of the sea according to a change in length of the operation members 410, and the landing platform 200 maintains level.

As described above, the landing platform 200 can effectively maintain level by the operations of the operation members 410 and the support member 300.

In these circumstances, the launch vehicle (S) adjusts its direction and location by reverse propulsion, and lands on the landing platform 200. In this instance, the control unit 600 operates the side thrusters 110 to adjust the location of the floating plate 100 if necessary. According to circumstances, the control unit 600 operates the side thruster 110 in interaction with the launch vehicle (S) through communication in order to adjust the location and the direction of the floating plate 100 so that the launch vehicle (S) can land at the central part of the land platform 200.

Therefore, even it is not a nice weather day or even in the sea with rough waves, the barge for recovery the rocket launch vehicle according to the present invention can land the launch vehicle (S) on the landing platform 200 by reducing overturn of the launch vehicle (S).

When the launch vehicle (S) lands on the landing platform 200, the tug boat transports the barge for recovery of the rocket launch vehicle to a destination like a launch site from the sea. FIGS. 5 and 6 illustrate a state where the landing platform 200 on which the launch vehicle (S) lands is transported.

As shown in FIGS. 5 and 6, the launch vehicle (S) is suspended on the landing platform 200 by its weight without being lashed against the landing platform 200 through a separate cable due to its function and structure.

In the above state, while the barge for recovery of the rocket launch vehicle is transported from the sea, even though the surface of the sea is inclined by external causes, such as waves, the barge for recovery of the rocket launch vehicle can maintain level of the landing platform 200. Referring to FIG. 4, through the above-mentioned method, the control unit 600 adjusts the lengths of the operation members 410 in order to maintain level of the landing platform 200. In this instance, as described above, the support member 300 supports the landing platform 200 relative to the floating plate 100 not to be exposed to an excessive load and operates the operation members 410.

Then, in the state where the launch vehicle (S) does not fall down and is suspended on the landing platform 200 in safety, the barge for recovery of the rocket launch vehicle according to the embodiment of the present invention can be transported to a target place on the sea by the tug boat.

Through the above process, when the barge for recovery of the rocket launch vehicle is transported on the shore, the barge for recovery of the rocket launch vehicle comes alongside the land and the launch vehicle (S) is transported on the land.

In the meantime, lubricant is applied between the support ball 310 and the ball block 320 of the support member 300. As described above, because the ball block 320 has the lubrication groove 321 formed on the surface thereof, it helps that the lubricant is effectively supplied and applied to contact surfaces of the support ball 310 and the ball block 320. The lubrication module 330 supplies, recovers and circulates the lubricant through the lubricant supply passages 322 formed in the ball block 320. If necessary, the lubrication module 330 filters and removes seawater and contaminants contained in the lubricant and circulates the filtered lubricant. The support ball 310 changes the angle between the support ball 310 and the ball block 320 while sliding relative to the ball block 320 smoothly by the operation of the lubrication module 330.

The jack-up members 700 are disposed for maintenance, so may be separated from the floating plate 100 and stored in safety if they are not used. Only in case of need, the jack-up members 700 are mounted on the floating plate 100 to be used.

Meanwhile, the barge for recovery of the rocket launch vehicle according to the embodiment of the present invention is used to supply propulsion to a rocket regardless of stages of the rocket and to recover the launch vehicle which drops after being isolated.

While the present invention has been particularly shown and described with reference to the embodiment thereof, it will be understood by those of ordinary skill in the art that the scope of the present invention is not limited by the described and illustrated forms.

For instance, the support member 300 has the support ball 310 and the ball block 320, wherein the support ball 310 is combined with the landing platform 200 and the ball block 320 is combined with the floating plate 100, and vice versa. That is, the support ball 310 may be combined with the floating plate 100 and the ball block 320 may be combined with the landing platform 200.

Furthermore, the support member may have other various components to support the landing platform while allowing the slope between the landing platform and the floating plate.

Additionally, in this embodiment, the four operation members 410 are used, but the number and the mounted locations of the operation members may be varied.

In addition, in this embodiment, the slope sensors 500 are mounted on the floating plate 100, but may be mounted on the landing platform or may be mounted on all of the floating plate 100 and the landing platform. Especially, if the slope sensors are mounted on all of the floating plate 100 and the landing platform, the control unit grasps the slope of the landing platform and the slope of the floating plate by the slope sensors and operates the operation members in real time so as to adjust the angle between the landing platform and the floating plate and maintain level of the landing platform.

Moreover, in this embodiment, the barge for recovery of the rocket launch vehicle includes the jack-up members 700 and the lubrication module 330, but may not include the jack-up members 700 or the lubrication module 330, or all of the jack-up members 700 and the lubrication module 330.

The lubrication module may have one of various structures which are not described in this embodiment.

What is claimed is:

1. A barge for recovery of a rocket launch vehicle, comprising:
a floating plate formed in the barge to float on a sea;
a plate shaped landing platform arranged above the floating plate so that a launch vehicle can land on the plate shaped landing platform;
a support member mounted between the floating plate and the plate shaped landing platform in order to support the landing platform relative to the floating plate while allowing a slope of the plate shaped landing platform relative to the floating plate;
a plurality of operation members of which both ends are respectively connected to the floating plate and the plate shaped landing plate in order to adjust an angle between the floating plate and the plate shaped landing platform, the plurality of operation members varying their lengths according to an operation signal;
slope sensors mounted on at least one of the floating plate and the plate shaped landing platform in order to sense a slope of one of the floating plate and the plate shaped landing platform; and
a controller which receives a measured value of the slope sensors and generates the operation signal to operate the plurality of operation members in order to maintain a level of the plate shaped landing platform.

2. The barge according to claim 1, wherein the support member comprises: a support ball formed convexly in a spherical shape and combined with any one among the floating plate and the plate shaped landing platform, and a ball block formed concavely to correspond to the support ball so as to support the support ball to be slidable and combined with the other one among the floating plate and the plate shaped landing platform.

3. The barge according to claim 2, further comprising:
a lubrication groove disposed in at least one of the support ball and the ball block of the support member in order to supply a lubricant; and
a lubrication module for supplying the lubricant onto contact surfaces of the support ball and the ball block of the support member.

4. The barge according to claim 1, further comprising:
a plurality of side thrusters mounted on the floating plate and propelling the floating plate in a horizontal direction to a surface of the sea in order to adjust a location of the floating plate,
wherein the controller controls operation of the plurality of side thrusters.

5. The barge according to claim 1, further comprising:
a plurality of jack-up members mounted between the floating plate and the plate shaped landing platform to raise the plate shaped landing platform relative to the floating plate.

6. The barge according to claim 1, wherein the plurality of operation members are arranged at intervals of a same angle around the support member.

7. The barge according to claim 6, wherein the plurality of operation members comprises four operation members.

* * * * *